March 12, 1929.    L. W. LANGFORD    1,705,091
AUTOGRAPHIC PUNCHING REGISTER
Filed July 14, 1927    6 Sheets-Sheet 1
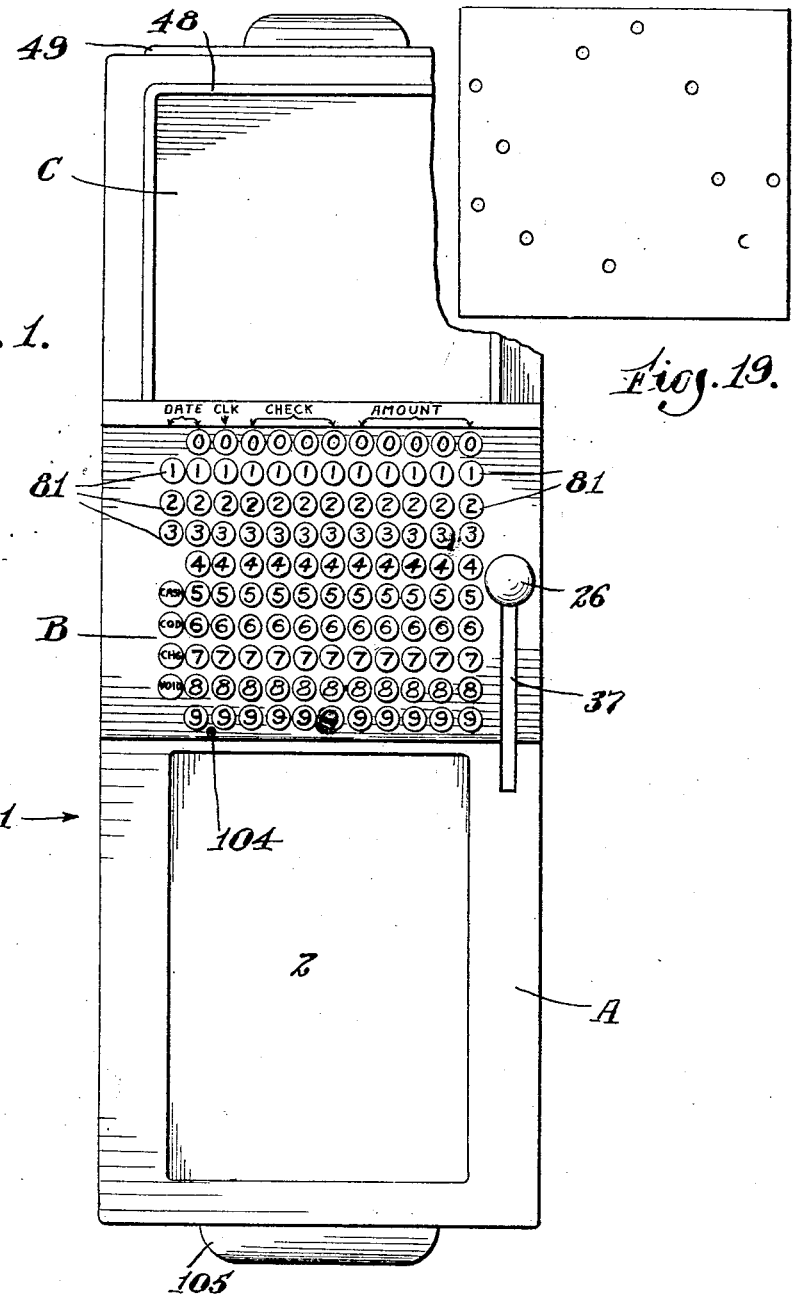

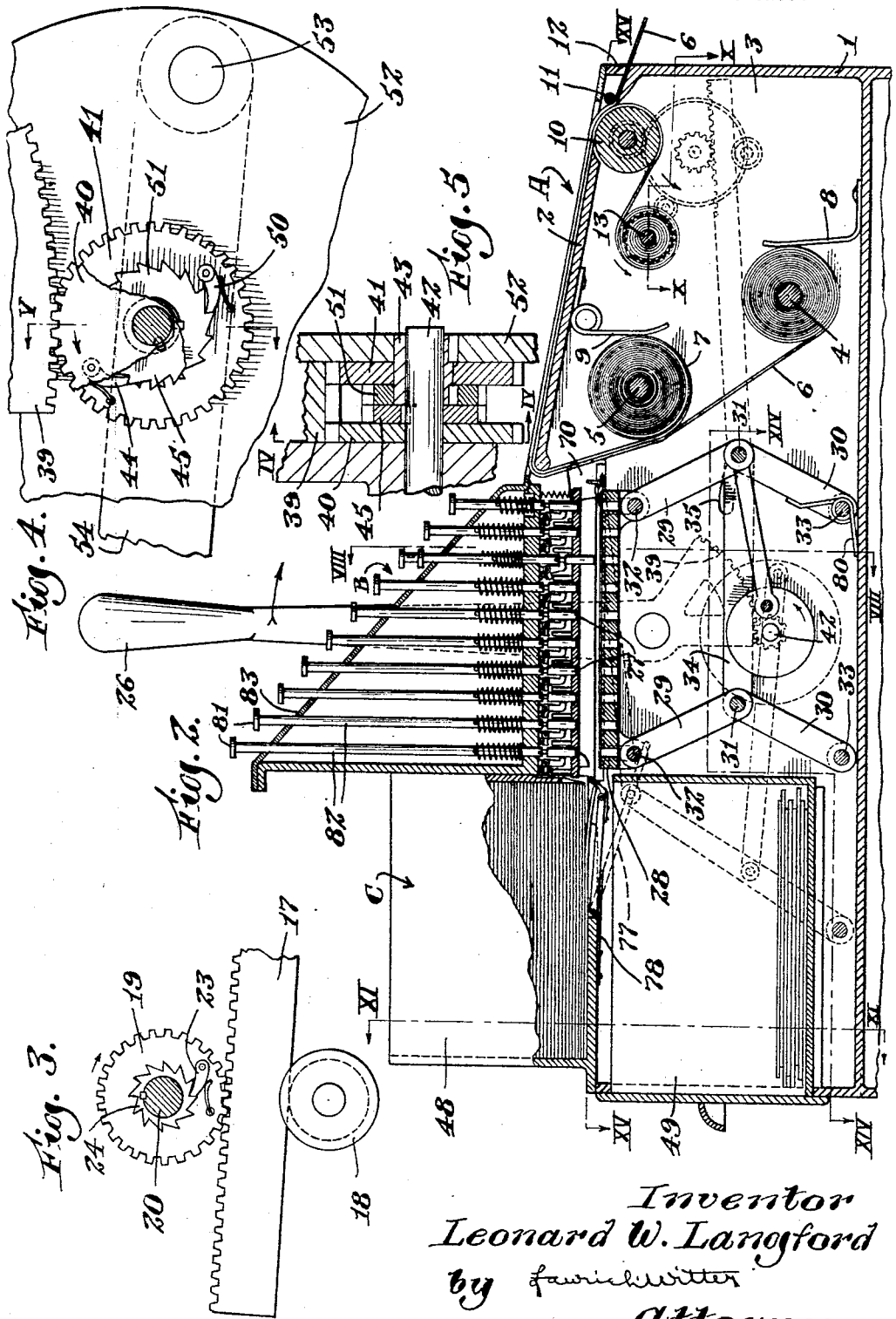

March 12, 1929.  L. W. LANGFORD  1,705,091
AUTOGRAPHIC PUNCHING REGISTER
Filed July 14, 1927   6 Sheets-Sheet 3
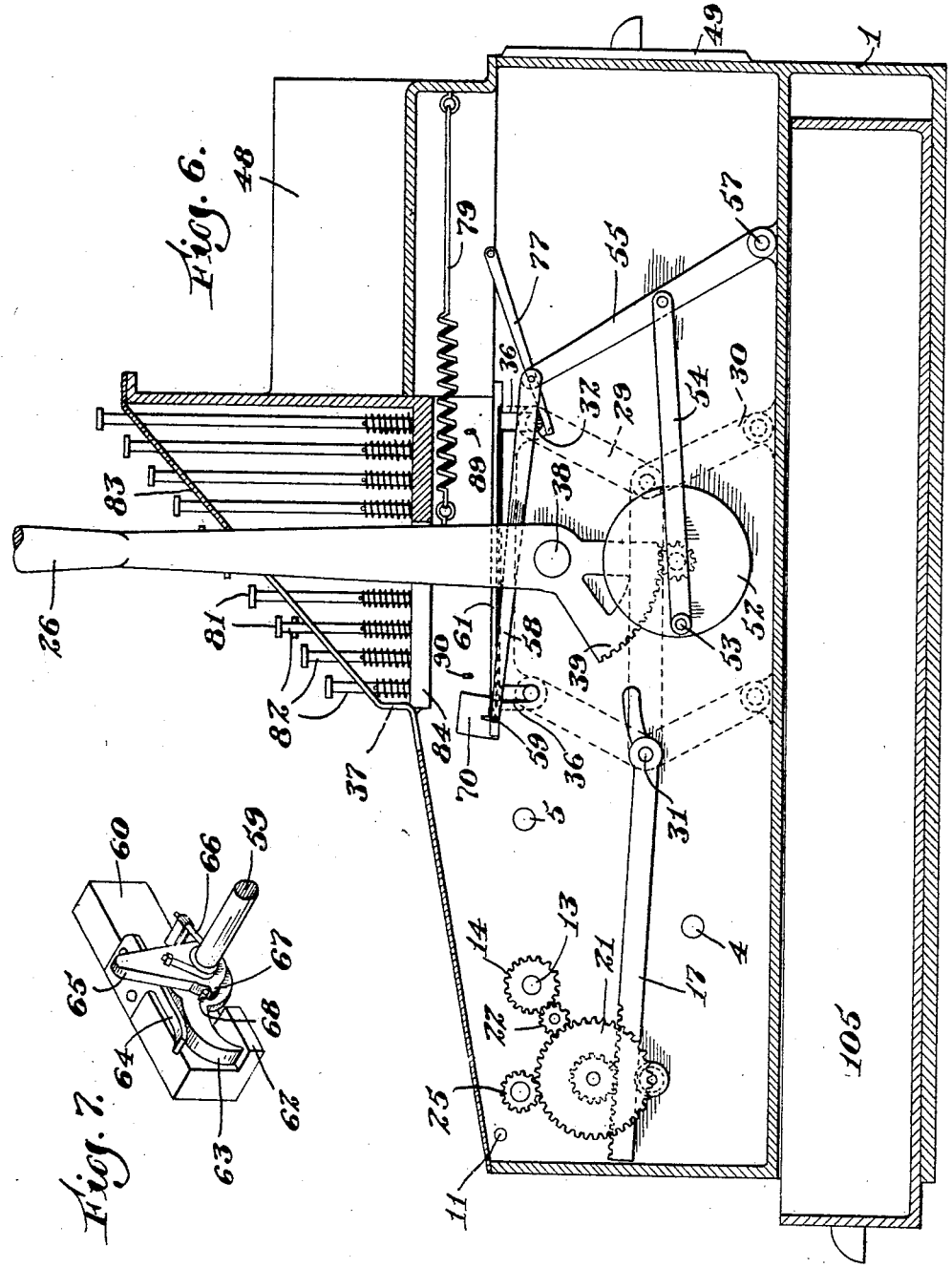
Inventor
Leonard W. Langford
by
Attorney March 12, 1929.  L. W. LANGFORD  1,705,091
AUTOGRAPHIC PUNCHING REGISTER
Filed July 14, 1927    6 Sheets-Sheet 4
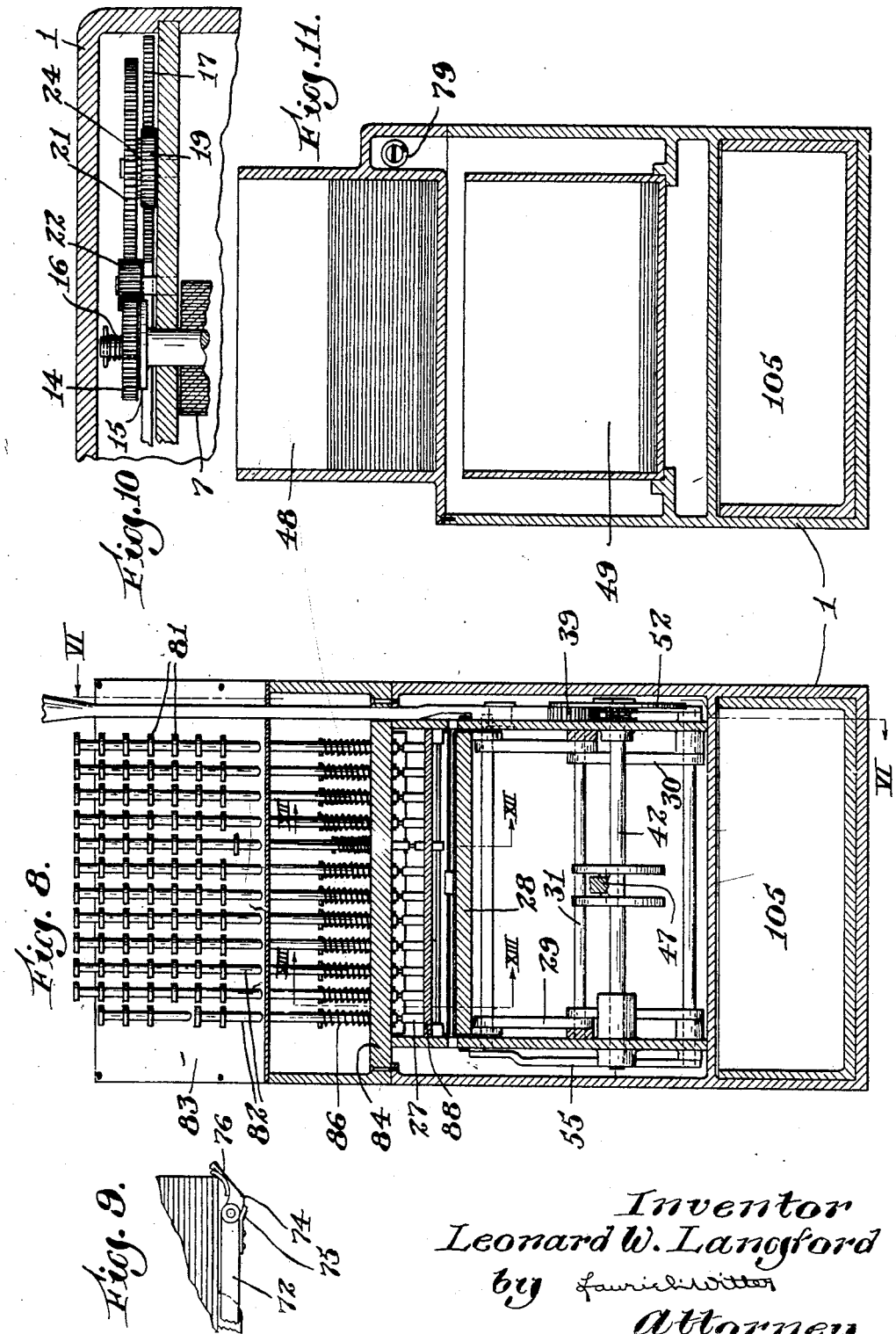
Inventor
Leonard W. Langford
by Laurie Witter
Attorney

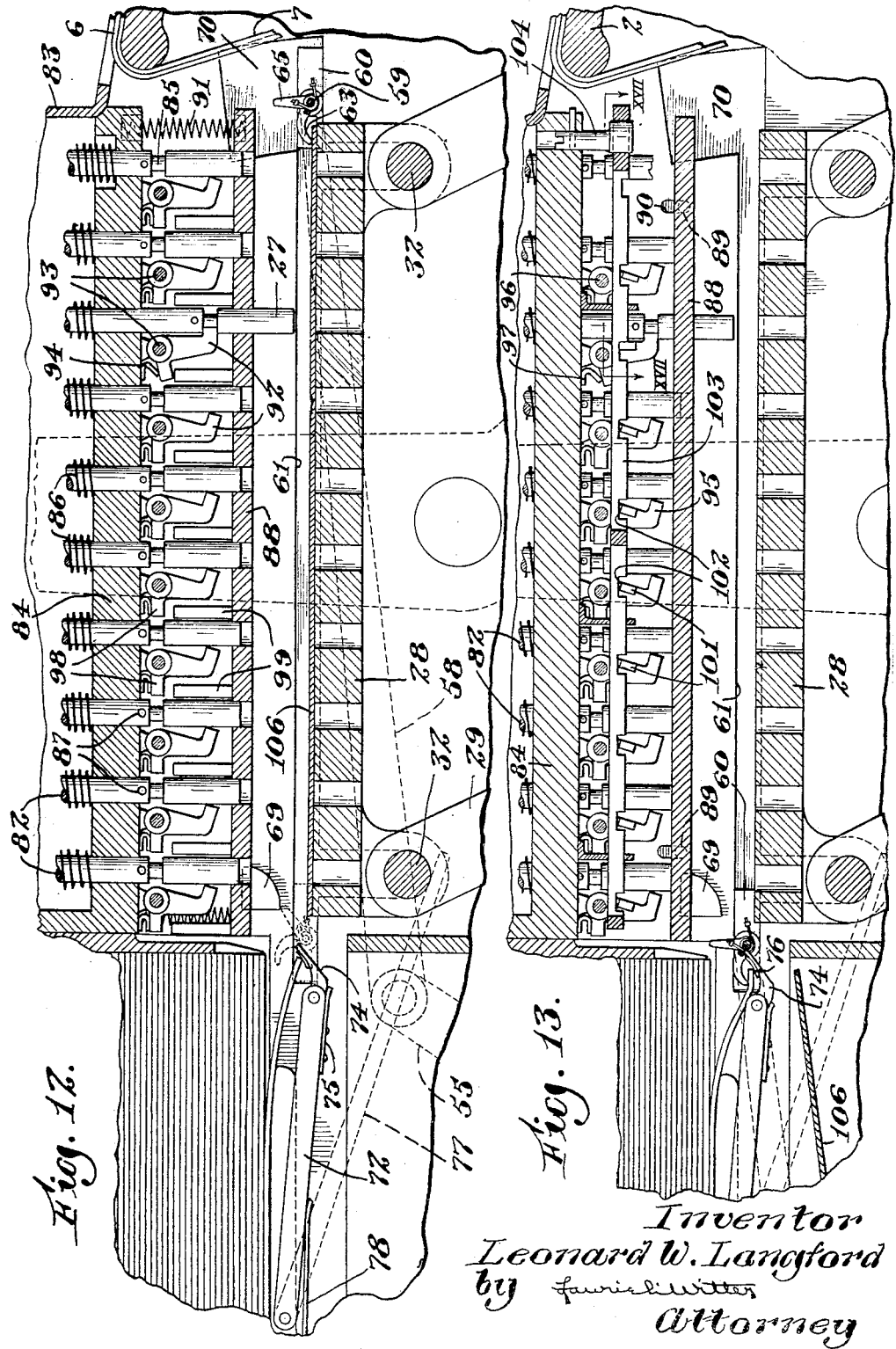

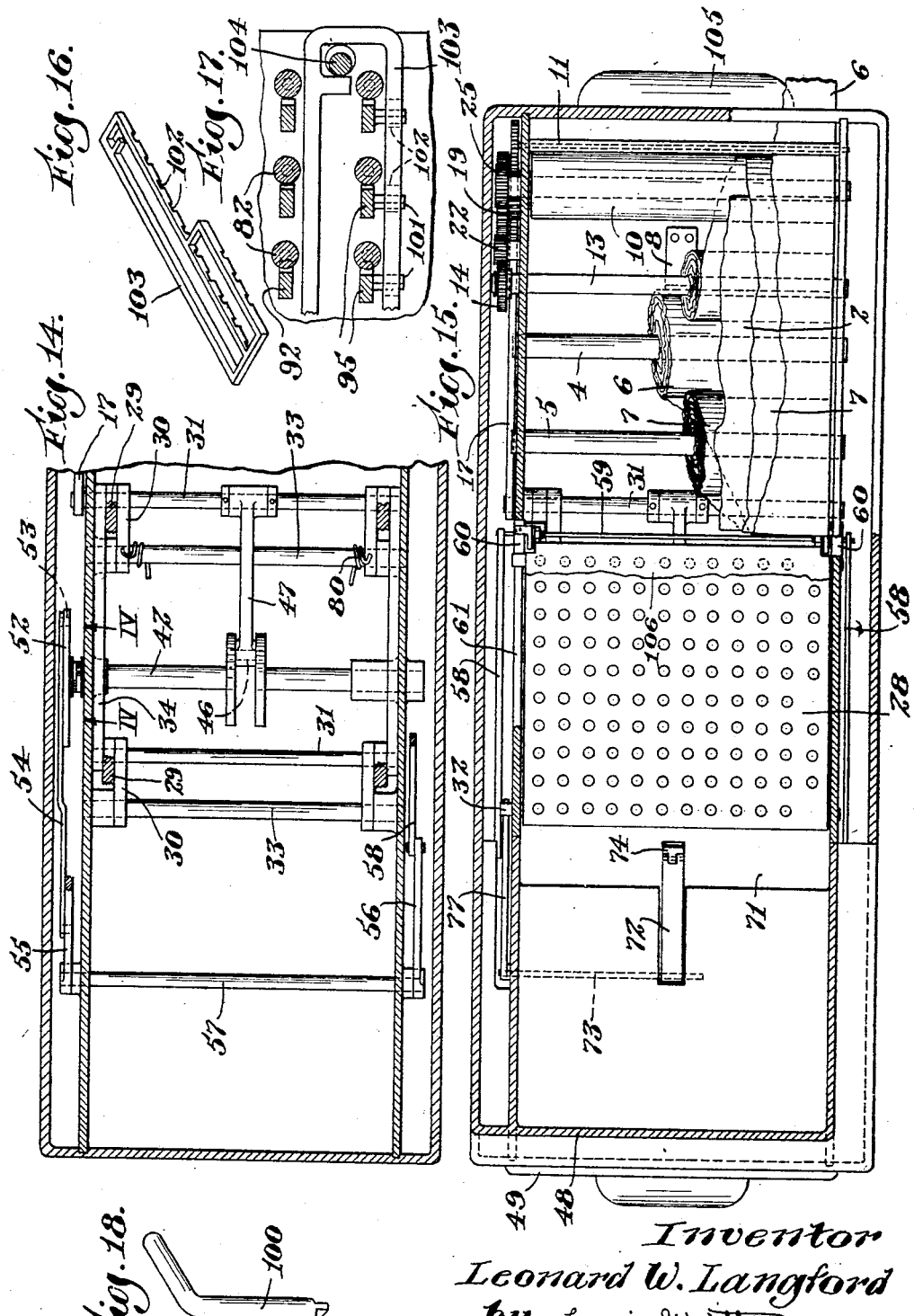

Patented Mar. 12, 1929.

1,705,091

UNITED STATES PATENT OFFICE.

LEONARD W. LANGFORD, OF BOSTON, MASSACHUSETTS, ASSIGNOR TO LANGFORD SALES AUDIT MACHINE COMPANY, A CORPORATION OF MASSACHUSETTS.

AUTOGRAPHIC PUNCHING REGISTER.

Application filed July 14, 1927. Serial No. 205,756.

This invention relates to an autographic-punching register and the primary object of the invention is to provide a unitary sales recording machine in which a salesman can make a usual sales ticket in writing and at the same time make a punched card representing the transaction, the cards being particularly adapted to be thereafter mechanically operated upon through the perforations therein to automatically record or secure data of the sales.

In the recording of sales made in department and other retail stores, it is now common practice for the clerk or other salesman to write out each order or sale on a separate sales slip which is of such character or is so supported that one or more duplicate copies are made by suitable carbon interleaves or surfaces. One copy is generally delivered with the goods and another copy is retained by the salesman until such time as it is collected by or delivered to the auditing, bookkeeping or other department for use in tabulating the daily sales, making up the ledgers and the bills of the charge customers, or for other purposes. Of course the practice differs in different stores, depending upon the size of the store and the bookkeeping, auditing and billing system employed.

In order that the manager or proprietor may have an accurate record of each day's transactions, it is necessary for a staff of clerks to copy off the totals of all the sales slips and tabulate them to show the information desired, as for instance, cash sales as handled by each cashier; total cash, C. O. D., and charge sales of each clerk, of each department, and of the entire store. In large stores it is not possible to obtain these figures for each day at the opening of business on the following morning unless a large staff is employed at night work, and even then such figures are often inaccurate, due to mistakes in copying.

There is a double source of error in the system commonly employed wherein the clerk copies his several sales slip totals on a separate sheet in the back of his sales book and the auditing department copies them from these sheets. Faint, indistinct, or poorly formed figures are a great source of error in securing the data as to the day's transactions.

In some of the largest stores the method now employed includes the making of punched record cards from the sales slips. These cards are made on punching machines in the main office by a corps of punch operators. Ordinarily the punch operators make these punched record cards from the sales slips of the previous day's sales on the day following the sales transactions. The punched cards are thereafter sorted in accordance with the character of the transactions, such as "Cash," "C. O. D.," and "Charge" sales; in accordance with departments etc. The sorted groups of cards are then run through a tabulating machine which totals and records the transactions. It will be obvious that such a method, like the copying method above outlined, involves considerable labor, many chances for errors and great delay and inconvenience in obtaining the final results.

My invention herein comprises a unitary machine wherein the salesmen, when originally making a sale, not only makes the usual sales slip or ticket in writing but also forms a corresponding punched card for each ticket, which cards are adapted to thereafter be used to control a tabulating machine in automatically auditing the sales. The punchings through the cards may indicate the amount of the sale, the character of the sale, date, clerk number, the check or inventory number of the goods sold, and any other desired data.

In the accompanying drawings I have illustrated one specific embodiment of my invention but it will be understood that the invention can be otherwise embodied and that the drawings are not to be construed as defining or limiting the scope of the invention, the claims appended hereto being relied upon for that purpose.

Referring to the figures of the drawings:

Fig. 1 is a plan view of an autographic-punching register illustrative of my invention.

Fig. 2 is a vertical longitudinal sectional view therethrough.

Fig. 3 is a detail view of the ticket strip moving means.

Fig. 4 is a detail view of another portion of the ticket strip and card moving means and the punching means, taken on line IV—IV of Figs. 5 and 14.

Fig. 5 is a sectional view taken on line V—V of Fig. 4.

Fig. 6 is a view similar to Fig. 2 from the opposite side of the machine.

Fig. 7 is a detail view of a card gripper.

Fig. 8 is a cross sectional view taken on line VIII—VIII of Fig. 2.

Fig. 9 is a fragmentary view of the card magazine.

Fig. 10 is a detail view of the rewinding roll taken on line X—X of Fig. 2.

Fig. 11 is a vertical sectional view through the card magazine on line XI—XI of Fig. 2.

Fig. 12 is a vertical sectional view through the punching mechanism on line XII—XII of Fig. 8 and showing a card in position to be punched.

Fig. 13 is a like view, on line XIII—XIII of Fig. 8, showing the mechanism ejecting a punched card and gripping a blank card.

Fig. 14 is a fragmentary sectional view taken on line XIV—XIV of Fig. 2.

Fig. 15 is a like sectional view taken on line XV—XV of Fig. 2.

Fig. 16 is a perspective view of a latch plate for the date punches.

Fig. 17 is a detail sectional view of the punch-latching mechanism taken on lines XVII—XVII of Fig. 13.

Fig. 18 is a detail view of a latch releasing key.

Fig. 19 illustrates a punched card.

Referring more specifically to the drawings by reference characters, 1 indicates the body portion of my improved sales recording device. As seen in Figs. 1 and 2, the section A of the machine, nearest the operator, is the autographing portion and the adjacent section B is the punching portion, the section C being the car magazine portion. The top surface of the portion A slopes downwardly in a manner providing a writing platen 2. Beneath the platen is a chamber 3 in which are supported two shafts 4 and 5 carrying rolls of sales slips 6 and 7. Springs 8 and 9 press against these rolls in a manner preventing free rotation thereof.

The strips 6 and 7 extend from the rolls over the platen 2 in a manner respectively forming original and duplicate sales slips. Both strips 6 and 7 extend over a roller 10 and from thence beneath a friction roller 11 and from thence the original strip 6 extends outwardly through a slot having a knife 12 against which each ticket can be torn from the strip. The duplicate strip 7 passes around the roller 10 and is wound onto a shaft 13. This rewind shaft 13 is driven by a gear 14 connected to the shaft through a friction clutch 15, the parts being held in contact by means of a spring 16. The purpose of this clutch connection is to allow for the continual increase in the size of the roll on this shaft.

The gear 14 is driven from a reciprocating rack 17 resting on a roller 18 and in mesh with a gear 19 on a shaft 20. A large gear 21 on the shaft 20 drives the gear 14 through an idler pinion 22. As seen in Fig. 3, the gear 19 is loose on the shaft 20 and drives the shaft through a pawl 23 on the gear engaging a ratchet 24 keyed to the shaft. Movement of the rack in one direction drives the shaft and movement thereof in the other direction drives only the gear 19. The gear 21 is also in mesh with a pinion 25 connected to and driving the roller 10. The rack 17 is driven from the main operating handle 26 by mechanism hereinafter described.

The portion B of the machine includes a plurality of punches 27 and a cooperating die plate 28. The mechanism for operating the die plate to perform the punching operation is closely associated with and serves to also operate the rack 17 and the sales strip moving means. This mechanism will now be described.

The die plate 28 is carried by eight links 29 and 30, the upper four links 29 being connected to the lower links 30 by rods 31 in a manner forming toggle joints. The upper links are connected to the die plate by rods 32 and the lower links are connected to the base by rods 33. The rods 31 are connected together by links 34 and the ends of one rod 31 are extended to pass through slots 35 in the sides of the casing. These slots limit the movement of the links and die plate in the punching operation. The ends of rods 32 are extended to pass through slots 36 in the sides of the casing. This arrangement aids in holding the die plate in proper position.

The handle 26 extends downwardly through a slot 37 in the casing and is pivoted at 38. The portion of the handle below the pivot is formed into a relatively wide sector 39 in mesh with two pinions 40 and 41 on a shaft 42. The pinion 40 is loose on the shaft 42 and the pinion 41 is loose on a bushing 43 loose on the shaft. A pawl 44 on the pinion 40 engages a ratchet 45 keyed to the shaft. The intermediate portion of the shaft is formed into a crank 46 connected by a pitman 47 to one of the toggle joint rods 31. The arrangement is such that full movement of the handle to the right (Fig. 2) rotates the shaft 42 one turn, the pawl permitting the handle to return without rotating the shaft. Obviously this movement will straighten the toggle links and move the die plate upwardly to perform the punching operation, the said one rotation of the shaft also acting to bring the links and die plate back to normal position.

The portion C of the machine comprises an upper open magazine 48 for holding blank cards and a lower closed magazine in the form of a drawer 49 for receiving the punched cards. The following mechanism, also operated by the handle 26, is provided for automatically feeding the blank cards to the die and ejecting the punched cards therefrom.

A pawl 50 on the pinion 41 engages a ratchet 51 keyed to the bushing 43. Also keyed to this bushing is a disc 52. A crank pin 53 on this disc is connected by a link 54 to an arm 55. The arm 55 and a like arm 56 are connected to the ends of a shaft 57. The free ends of arms 55 and 56 are connected by links 58 to a crossbar 59.

Two card grippers 60 are carried at the ends of the crossbar 59. These grippers slide in slots 61 in the casing just above the die plate. Each gripper (Fig. 7) comprises a fixed member 62 and a movable finger 63 cooperating therewith, a spring 64 normally holding the finger in contact with the member. Each finger is adapted to be raised by an arm 65 on the crossbar 59. Each arm 65 is normally held in upright position by a spring 66 and a shoulder 67 on each arm is adapted to engage a pin 68 on the finger and raise the same when the arm is moved backwardly. The arms are automatically moved to the card releasing position by projections 69, as shown in broken lines in Fig. 12, when the crossbar is in its forward position. The springs 66 allow the grippers to move rearwardly under the projections without affecting the gripping fingers.

When the die plate is raised to perform the punching operation the grippers 60 are in the extreme right hand position shown in Figs. 2 and 12. The sides of the machine are provided with notches 70 directly above the grippers and into which the grippers can move when the die plate is raised.

As best shown in Figs. 9, 12 and 13 the blank cards rest on the bottom of the card magazine 48 and this bottom is shorter than the length of the cards in a manner leaving a gap 71 in the bottom beneath that end of cards which is adjacent to the die plate. An arm 72 mounted on a shaft 73 has its free end projecting into this gap. A hook 74 pivoted to the free end of the arm is normally held up in engagement with the edge of the bottom card by means of a spring 75, the hook being lined with a piece of rubber or other friction material 76 to cause it to engage and bend the bottom card downwardly. An arm 77 mounted on the shaft 73 extends under the front rod 32. A spring 78 normally holds the arm 73 up in the card engaging position. The arangement is such that with each upward movement of the die plate the hook 74 engages the edge of the bottom card and upon the downward movement of the die plate this card is bent downwardly to the position shown in Fig. 12, in which position it is ready to be engaged by the grippers 60.

It will be observed that by means of the above described mechanism the forward stroke of the handle 26 operates to perform the punching operation and the rearward stroke thereof operates to eject the punched card and place a new blank card in its place on the die plate. The rearward movement of the handle is preferably accomplished by a spring 79 which assures the return of the machine to normal and the substitution of a fresh card after each punching operation. The breaking of the toggle links 29 and 30 is also preferably aided by springs 80 wound about the rear rods 33 and engaging against the lower rear links 30.

As seen in Fig. 1, the section B of the machine has eleven downwardly extending rows of punch buttons 81 containing ten buttons each, and one broken row containing seven buttons. The five right hand rows, marked "Amount", indicate the total of the sale and are adapted to register any amount up to $999.99. The next four rows, marked "check", indicate the class or inventory number of the goods sold. The next row, marked "Clk", indicates the number of the clerk making the sale. It may be found desirable to provide each clerk with a machine and in such case it will be understood that the row of clerk punches can be entirely eliminated. The next row and the three top buttons of the last row, marked "date", indicate the day of the month. Three of the remaining four buttons indicate the character of the sale as being a cash, C. O. D. or charge sale, and the remaining button is used when it is desired to entirely void a used sales ticket.

The buttons 81 are mounted on stems 82 extending downwardly through the top plate 83 of the casing and into the bottom plate 84 thereof. The punches 27 are formed on the bottoms of these stems, either integrally or otherwise, a latch-engaging gap 85 being provided therebetween. Springs 86 normally hold the stems and punches in the raised position and a pin 87 on each stem acts as a stop therefor. The lower ends of the punches extends into a stripper plate 88 supported by lugs 89 extending into vertical slots 90. The length of these slots is such as to permit the punching operation but prevent the punches from disengaging from the plate. The springs 91 normally hold the plate in its extreme downward position shown in Fig. 12.

All the punches, except the date punches, must be set up by the operator each time a sale is made. Since the date remains the same throughout the day these punches are set up only at the beginning of each day. A mechanism is provided for keeping the same so set. The following mechanism, shown particularly in Fig. 12, is provided for latching and releasing all the punches, except the date punches. A pawl 92 is provided for each punch and is adapted to engage the gap 85 and hold the punch depressed. The pawls are pivotally mounted on rods 93 and are normally forced to the engaging position by springs 94. When a punch is depressed its latch snaps into its gap 85 and holds the punch so depressed. A like set of pawls 95 mounted on rods 96 and operated by springs 97 (Fig. 13) is provided for the date punches.

Means for automatically releasing all except the date punches at each punching operation is illustrated in Fig. 12. Each pawl 92 is provided with a projection 98 and beneath each such projection on the stripper plate 88 is a post 99. The movement of the die plate is such that at each punching operation the die plate and card thereon engage against and raise the stripper plate upwardly sufficiently to engage the posts 99 with the projections 98 and thereby swing the latches to release the set punches.

The mechanism whereby the date punches can be released only by a key 100 (Fig. 18) is shown in Figs. 13, 16 and 17. Each pawl 95 is provided with a projection 101 extending into a notch 102 in a sliding plate 103. A stud 104 has an eccentric on its lower end engaging within a hole in this plate. The upper end of the stud is adapted to be engaged and rotated by the key 100. Rotation of the stud operates to slide the plate and thereby pivot the pawls 95 to the punch releasing position. It will be understood that this key is retained by the store management and used only once in 24 hours to change the setting of the date punches. The machine is provided with the usual cash drawer 105.

The operation of the machine illustrated and above described is substantially as follows: It is assumed that the magazine 48 is provided with a stack of blank cards to be punched, that the rolls of sales tickets 6 and 7 are threaded up to the position illustrated in Fig. 2, and that the punch buttons indicating the day of the month have been depressed. It will also be understood that some suitable carbon means is provided between the two sales slips on the platen 2 whereby writing on the original ticket 6 will be transferred to the duplicate ticket 7.

Upon making a sale, the clerk writes the necessary data on the sales ticket on the platen 2 in the usual manner and totals the amount of the sale. He then sets up a corresponding punching condition by depressing the corresponding punch buttons 81. The only further operation necessary to the functioning of the machine is the movement of the handle 26.

It should be particularly noted that the adjacent proximity of the platen 2 and punch buttons 81 permits the clerk to set up the punching condition directly after he totals the amount of the sale. This close association of the punch press and writing platen not only permits the clerk to set up this condition while the amount is fresh in mind but also with his own written figures of the same in full and close view. This relation of the parts also permits the clerk to compare the punch setting with his own written record before moving the handle 26 to actually perform the punching operation. It will be understood that the set punches are held in their depressed condition by the mechanism heretofore described.

The data being properly written on the sales ticket and set up on the punch press, the operator grasps the handle 26 and pulls the same forward the full stroke. This forward stroke rotates the pinions 40 and 41 one full turn in the direction of the arrow (Fig. 4). The pinion 40 by means of the pawl 44 carries its ratchet 45 and the shaft 42 therewith, the pawl 50 permitting the pinion 41 to rotate idly in this direction. This rotation of the shaft 42 through the crank 46 straightens the toggle links 29—30 which raises the die plate and performs the punching operation. The rack 17, being connected to the rod 31, is also reciprocated in a manner moving the sales strips 6 and 7 the length of one ticket. The top ticket is projected outwardly where is may be torn off on the knife edge 12 while the duplicate ticket is wound onto the shaft 13. When the shaft 42 has completed its rotation the parts operated thereby will be left in their original and normal position.

When the die plate moves to its uppermost position the arm 72 and hook 74 assume the position illustrated in Fig. 9 wherein the rubber pad 76 is engaged with edge of the bottom card. When the die plate is lowered the arm 72 is swung downward by means of the arm 77 and shaft 73. This operation bends the bottom card downward in the manner shown in Fig. 12 wherein such card is ready to be grasped by the grippers 60. It should also be noted that in its uppermost position the die plate raises the stripper plate 88 and through the posts 99 pivots the latches 92 in a manner releasing the set punches. The date punches held by the latches 95 can be released in like manner by means of the key 100.

When the handle 26 starts its return stroke under the action of the spring 79 the pinions 40 and 41 will be rotated in the direction opposite to the arrow in Fig. 4. The pawl 44 now permits the pinion 40 to rotate idly while the pawl 50 causes its ratchet 51 and disc 52 to rotate with the pinion 41. Rotation of the disc 52 moves the cross bar 59 and grippers 60 from the position shown in full lines in Fig. 12 to that shown in broken lines therein. The punched card 106 on the die plate is moved along by the grippers and ejected into the magazine 49. The bottom of the hook 74 is beveled off in a manner serving to direct the card downwardly into the magazine beneath the hook.

When the grippers 60 reach the projections 69 the arms 65 riding beneath such projections are automatically moved backward thereby in a manner raising the fingers 63 and releasing the punched card 106. This card thereupon drops into the chamber 49 as shown in Fig. 13. The continued movement of the grippers causes them to engage the bottom card in the magazine 48 in a manner shown in Figs. 12 and 13. When the arms 65 leave the projections 69 the fingers 63 snap into gripping engagement with this card and return movement of the grippers draws the new card into punching position on the die. When the handle has reached the end of its return stroke the parts operated thereby will all be left in their original and normal position and a new card will be in place on the die plate.

The punched card illustrated in Fig. 19 has recorded thereon the following data:

| | |
|---|---|
| Character of sale | C. O. D. |
| Day of month | 24th |
| Clerk number | #7 |
| Class number of goods sold | #180 |
| Amount of sale | $25.75 |

It is believed that the great advantages resulting from my invention herein will be obvious. The invention, as illustrated, comprises a unitary machine which can be easily moved about from place to place as may be required and, in use, the only operation necessary in addition to that now required by the well known autographic register, is the depressing of the punch buttons to correspond with the data recorded on the sales slip, the movement of the handle 26, being no more nor less than that of the ordinary autographic register. And yet, with only this one additional operation (depressing of the punch keys) a punched record of each sale is automatically produced.

It should also be particularly noted that the punched record is not only produced at a minimum of expense and time but also that the same is produced with far greater accuracy than has been done heretofore. It is obvious that the setting up of the punching condition by the sales clerk at the time he makes the sale, and while the data thereof is fresh in mind, will result in the maximum accuracy. Furthermore, the comparing of the punch-set condition to the clerk's own written record is a further check-up on the accuracy of the punched record, since, as is well known, one can read his own writing best.

Some of the advantages may be enumerated as follows:

1. Eliminates the expense and trouble of making a punched record as a later independent operation by other employees, and at practically no additional labor or expense in the original transaction.

2. Eliminates the greater portion of errors attending present methods, since the entire operation is performed at one time in one transaction by one person.

3. Eliminates the delay of present methods. By the improved method the punched records are run through the auditing machine at the end of each day and the entire data of the day's business thereby quickly secured.

While I have herein described my invention in connection with and as particularly adapted to the use of sales recording, it should be understood that the same is not to be considered as in any way limited to this field of work. The invention is also adapted to use in many other well known fields, such, for example, as the handling of goods by railroads, recording of stock in manufacturing plants, etc.

Having described my invention, what I claim is:

1. In an autographic register having a base, a writing platen on the base and means for moving a record strip over the platen, a punch press on the base for making a punched record and comprising a plurality of punches, means adjacent the platen for setting up a predetermined punching condition, a die cooperating with the punches, a magazine for holding a supply of cards, a second magazine for receiving the punched cards, and means operated by the record strip moving means to punch a card in accordance with the said set-up condition and to eject such card into the second magazine and place a card from the first magazine into position for the next punching operation, the arrangement being such that the operator can autographically record a transaction on the strip on the platen and then set up a corresponding punching condition, whereby a punched record corresponding to the autographic record may be formed at each movement of the first mentioned means.

2. In an autographic register having a base, a writing platen on the base and means for moving a record strip over the platen, a punch press on the base for making a punched record and comprising a plurality of punches, means adjacent the platen for setting up a predetermined punching condition representing a definite sum and other related date, a die cooperating with the punches, and means operated by the record strip moving means for causing a relative approaching movement between the die and punches to punch a card placed therebetween in accordance with the said condition, the arrangement being such that the operator can autographically record a transaction on the strip on the platen and then set the second named means to correspond thereto, whereby a punched record corresponding to the autographic record may be formed at each movement of the first mentioned means.

3. In an autographic register having a base, a writing platen on the base and means for moving a record strip over the platen, a punch-press on the base for making a punched record and comprising a plurality of punches, means adjacent the platen for operating the punches, a magazine for holding a supply of cards, a second magazine for receiving the punched cards, and means operated by the record strip moving means for moving one of the cards from the first magazine to a position between the punches and die and for ejecting the punched card into the second magazine, the arrangement being such that the operator can autographically record a transaction on the strip on the platen and then depress the punches corresponding thereto, whereby a corresponding punched record may be formed for each autographic record.

4. In an autographic-punching register, a base and a writing platen thereon, a punch press on the base for making a punched record and comprising a plurality of punches, means adjacent the platen for setting up a predetermined punching condition, a die cooperating with the punches, a unitary driving element, means operated therefrom to punch a card in accordance with the said set-up condition and to eject such card and place a blank card into position for the next punching operation and to feed a record strip over the platen, and means automatically restoring the punching mechanism from the said set-up condition to normal condition after completion of the punching operation, the arrangement being such that the operator can autographically record a transaction on the strip on the platen and then set up a corresponding punching condition whereby a punched record corresponding to the autographic record may be formed at each operation of the driving element.

5. In an autographic-punching register, a base and a writing platen thereon, a punch press on the base for making a punched record and comprising a plurality of punches, means adjacent the platen for setting up a predetermined punching condition, a die cooperating with the punches, a lever, means operated by movement of the lever in one direction to punch a card in accordance with the said set up condition, means operated by movement of the lever in the opposite direction to eject such card and place a blank card into position for the next punching operation, and means operated by the lever to feed a record strip over the platen, the arrangement being such that the operator can autographically record a transaction on the strip on the platen and then set up a corresponding punching condition whereby a punched record corresponding to the autographic record may be formed at each operation of the lever.

6. In an autographic-punching register, a base and a writing platen thereon, a punch press on the base for making a punched record and comprising a plurality of punches, means adjacent the platen for setting up a predetermined punching condition, a die cooperating with the punches, a magazine for holding a supply of cards, a second magazine for receiving the punched cards, means operative to punch a card in accordance with the said set-up condition and to eject such card into the second magazine and place a card from the first magazine into position for the next punching operation, and means operated from the last mentioned means to feed a record strip over the platen, the arrangement being such that the operator can autographically record a transaction on the strip on the platen and then set up a corresponding punching condition whereby a punched record corresponding to the autographic record may be formed at each movement of the second mentioned means.

In testimony whereof I affix my signature.

LEONARD W. LANGFORD.